(12) United States Patent
Liu et al.

(10) Patent No.: US 9,628,871 B1
(45) Date of Patent: Apr. 18, 2017

(54) TARGETED ASSET INSERTION WITH ASSET DECISIONING IN COD

(71) Applicant: Canoe Ventures, LLC, Englewood, CO (US)

(72) Inventors: Yong Liu, Englewood, CO (US); Valentin Turcin, Denver, CO (US)

(73) Assignee: Canoe Ventures, Englewood, CO (US)

( * ) Notice: Subject to any disclaimer, the term of this patent is extended or adjusted under 35 U.S.C. 154(b) by 49 days.

(21) Appl. No.: 14/943,693

(22) Filed: Nov. 17, 2015

(51) Int. Cl.
| | |
|---|---|
| *H04H 60/32* | (2008.01) |
| *H04N 21/81* | (2011.01) |
| *H04H 60/43* | (2008.01) |
| *H04H 60/33* | (2008.01) |
| *H04N 7/173* | (2011.01) |
| *H04N 21/258* | (2011.01) |
| *H04N 21/262* | (2011.01) |
| *H04N 21/234* | (2011.01) |
| *H04N 21/222* | (2011.01) |

(52) U.S. Cl.
CPC .......... *H04N 21/812* (2013.01); *H04H 60/33* (2013.01); *H04H 60/43* (2013.01); *H04N 7/17309* (2013.01); *H04N 21/2221* (2013.01); *H04N 21/23424* (2013.01); *H04N 21/25883* (2013.01); *H04N 21/25891* (2013.01); *H04N 21/26241* (2013.01); *H04N 21/26283* (2013.01)

(58) Field of Classification Search
CPC ............. H04N 21/812; H04N 7/17309; H04N 21/2221; H04N 21/23424; H04N 21/25883; H04N 21/25891; H04N 21/26241; H04N 21/26283; H04H 60/33; H04H 60/43

See application file for complete search history.

(56) References Cited

U.S. PATENT DOCUMENTS

| | | | |
|---|---|---|---|
| 2003/0067554 A1* | 4/2003 | Klarfeld ............... | G11B 27/105 348/461 |
| 2005/0096978 A1* | 5/2005 | Black ..................... | G06Q 30/02 705/14.55 |
| 2010/0158098 A1 | 6/2010 | McSchooler et al. | |
| 2013/0263182 A1* | 10/2013 | Ivy ........................ | H04N 21/458 725/34 |
| 2016/0360250 A1* | 12/2016 | Canney .............. | H04N 21/2408 |

* cited by examiner

*Primary Examiner* — Oleg Asanbayev
(74) *Attorney, Agent, or Firm* — Duft Bornsen & Fettig LLP; Gregory T. Fettig

(57) ABSTRACT

One system herein is operable in a COD environment and includes an audience profiler that generates user profiles based on the demographic characteristics of users selecting COD content to identify a user based on a subsequent COD content selection. An ADS tracks impressions of assets in COD content selections, detects the subsequent COD content selection, and selects from the assets for insertion into that COD content selection. The ADS also processes the user profile of the user to exclude a first portion of the assets from insertion into the subsequent COD content selection. The ADS also excludes a second portion of the assets from insertion into the subsequent COD content selection based on the tracked impressions. The ADS also ranks remaining assets, and directs a COD content provider to insert the ranked assets according to the ranking and a number of available time slots in the subsequent COD content selection.

6 Claims, 9 Drawing Sheets

TARGETED ASSET INSERTION WITH ASSET DECISIONING IN COD

CROSS REFERENCE TO RELATED APPLICATIONS

This patent application is related to commonly owned and co-pending patent application Ser. No. 13/628,324, 13/628,360, and 13/628,381 (each having a filing date of Sep. 27, 2012), the entire contents of each of which are incorporated by reference.

FIELD OF THE INVENTION

The invention relates to the field of Content On Demand (COD) systems and asset insertions into COD content selections.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services increased, television evolved into a much more complex system of communications. Today, cable television providers and satellite television providers serve as intermediary content providers between the content providers and the intended public audience. And, the number of content providers has increased accordingly. In this regard, many members of the general public have signed on as customers of the cable/satellite content providers so as to receive a broader availability of content.

Because the market for content consumption has grown, the number of content providers has also grown. And, because each of these providers has its own method of content delivery, the manner in which the content and assets are delivered to the customers has become increasingly complex. Generally, the content providers deliver the content to the content providers with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the content providers with directions to insert the assets within the timeslots purchased by the company.

The content providers may also have certain timeslots available for inserting certain local assets. For example, a content provider may have "headends" configured in various communities to distribute content to their customers located therein. Each headend receives content from the content providers with various designated timeslots for inserting assets into the content. Some of those timeslots may be designated for local advertisements where companies within the service area of the headend wish to advertise. These companies purchase those timeslots from the content provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the content providers' customers are able to digitally record entire episodes of content and view that content at their leisure, as opposed to a time established by the content providers. However, these customers can also use the digital recorders to fast-forward or skip through the assets without viewing them, much to the dismay of the asset owners.

In response, content providers started providing content on a "Content On Demand" (COD) basis, sometimes referred to as nonlinear video distribution. In COD, the content provider delivers the content to the content provider which in turn maintains the content for subsequent and individual distribution to their customers. Thus, a customer may select a desired content through a set-top box (STB), a smart phone, computer, or the like (collectively referred to herein as "customer premise equipment" or "CPE") and watch that content at the customer's leisure.

This COD content can also be configured with timeslots where assets may be inserted. For example, an advertiser desiring to place an advertisement in a particular TV show may pay the owner of that TV show (e.g., a content provider such as NBC, ABC, CBS, etc.) to insert their advertisements into one or more the timeslots in the COD content. Once inserted, the asset is delivered in the COD content to a user's CPE.

SUMMARY

Systems and methods presented herein provide for asset insertion decisioning and targeted advertising via audience profiling. In one embodiment, a system is operable in a COD environment and includes an audience profiler that is operable to identify a first CPE based on a Household identification (HHID), to monitor COD content selections made by the first CPE, and to determine demographic characteristics of one or more users of the first CPE based on the COD content selections. The audience profiler is further operable to generate user profiles of the one or more users based on the demographic characteristics, and to identify a first of the one or more users of the first CPE based on the user profiles and a subsequent COD content selection from the first CPE.

The system also includes an asset decision system (ADS) communicatively coupled to the audience profiler and operable to track impressions of a plurality of assets in COD content selections across a plurality of CPEs, to detect the subsequent COD content selection by the first CPE, and to select from the plurality of assets for insertion into the subsequent COD content selection. The ADS is further operable to process the user profile of the first user to exclude a first portion of the assets from insertion into the subsequent COD content selection, to exclude a second portion of the assets from insertion into the subsequent COD content selection based on the tracked impressions of the assets. The ADS also ranks the assets remaining in the plurality of assets, and directs a COD content provider providing the subsequent COD content selection to insert the ranked assets according to the ranking and based on a number of available time slots in the subsequent COD content selection.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above. Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
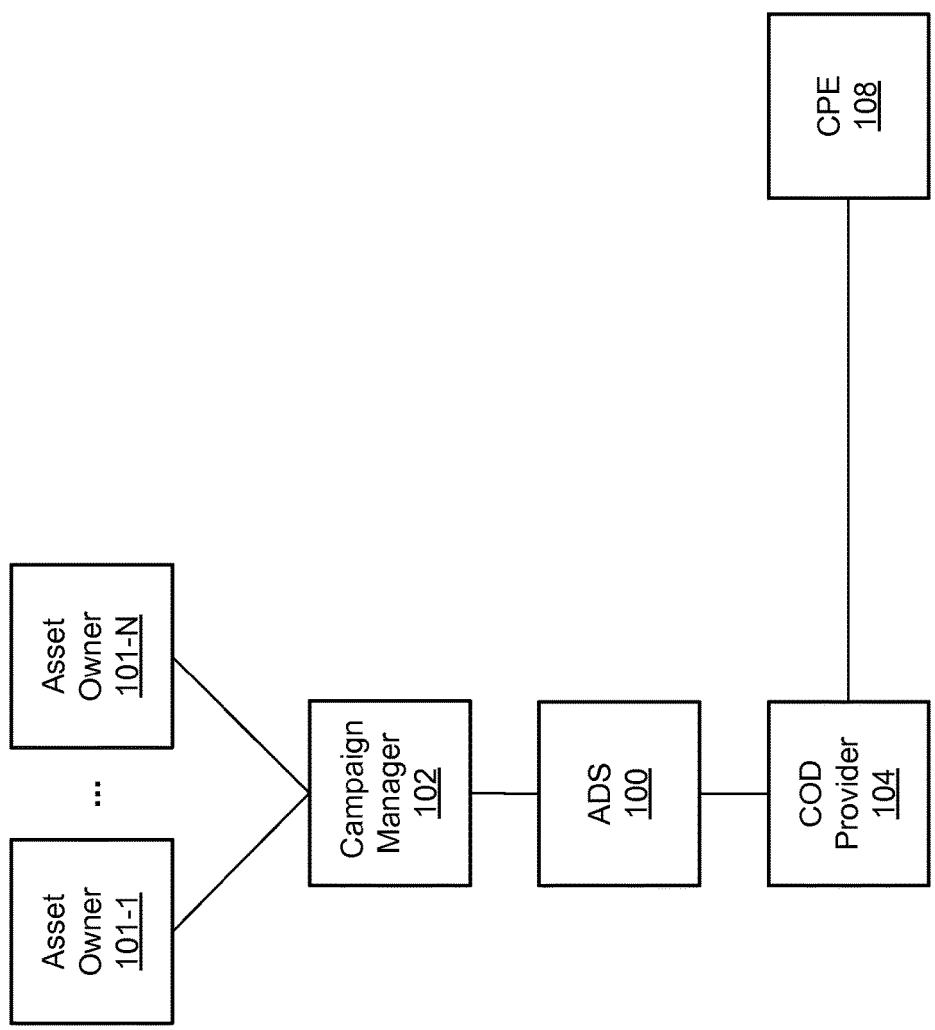
FIG. 1 is a block diagram of an exemplary ADS that directs assets for insertion into the COD content on behalf of a COD provider.

FIG. 1 is a block diagram of an exemplary ADS 100 that directs assets for insertion into the COD content on behalf of a COD provider 104. As mentioned, COD content selections made by a user through the user's CPE 108 can have assets (e.g., advertisements) inserted therein by a COD provider 104, such as a cable television headend, satellite television operator, or even a content owner. The ADS 100 is operable to improve the asset insertions by removing conflicting assets and/or ranking remaining assets such that they provide more value to the content provider 104 and/or asset owners 101-1-101-N (where the reference "N" is merely intended to represent an integer greater than "1" and not necessarily equal to any other "N" reference herein).

Generally, assets promoting products and services on television are maintained in databases by asset owners 101. A campaign manager 102 may include the databases that store local and national advertisements for COD content insertion in addition to the various campaign rules that are to be implemented with the COD content insertion. For example, the asset owners 101 develop campaigns which are subsequently managed and maintained by the campaign manager 102. The asset campaigns comprise rules and asset descriptions (e.g., configured as a data structure) that an asset owner 101 may believe serves the asset owner 101's best marketing interests. Then, these campaigns are passed to the ADS for the ADS to determine the best manner in which the assets of the asset owners 101 are to be inserted into the COD content provided by the COD provider 104.

The rules of the asset campaigns assist the ADS in determining how to exclude and/or promote certain assets in the COD content. For example, the Coca-Cola Company may have a number of advertisements it wishes to be inserted into COD content. Each of those advertisements may be associated with a campaign that targets various demographics of viewers (e.g., age, sex, ethnicity, location, etc.). Some of those assets may even cross multiple campaigns. And, each asset campaign has rules that may, for example, prevent Pepsi-Cola Company advertisements from being inserted too close in time to Coca-Cola advertisements. The campaign manager 102 manages these asset campaigns and provides them to the ADS 100 such that the ADS 100 can select assets that provide value to the COD provider 104 while complying with the rules of the asset campaigns.

The ADS 100 is any device, system, software, or combination thereof operable to implement the rules of the campaigns and subsequently rank assets for insertion in the content provided by COD provider 104. The ADS 100 is generally configured as a system that is separate and distinct from the COD provider 104 such that the ADS 100 may interact with a plurality of COD providers. In some embodiments the campaign manager 102 and the ADS 100 are implemented together so as to provide a compact/centralized system for maintaining asset campaigns and directing insertion of the assets into the COD content while still being able to serve multiple COD providers. Additional details regarding the ADS 100 and the actual insertion of assets in the COD content are shown and described below.

The CPE 108 is any device or system capable of providing content from a content provider 104 to a user. For example, a CPE 108 may be a set-top box operable to communicate with a cable television headend. Alternatively, a CPE 108 can be a computer capable of displaying video from a network. For example, a CPE 108 may select content from an Internet website hosted with an internet server through the network. Once selected, a COD system of the COD provider 104 may retrieve the content from a content database for Internet delivery (e.g., streaming video) to the selecting CPE 108. Other examples of the CPE 108 include gaming consoles, smart phones, electronic tablets, or the like.

Figure 2:
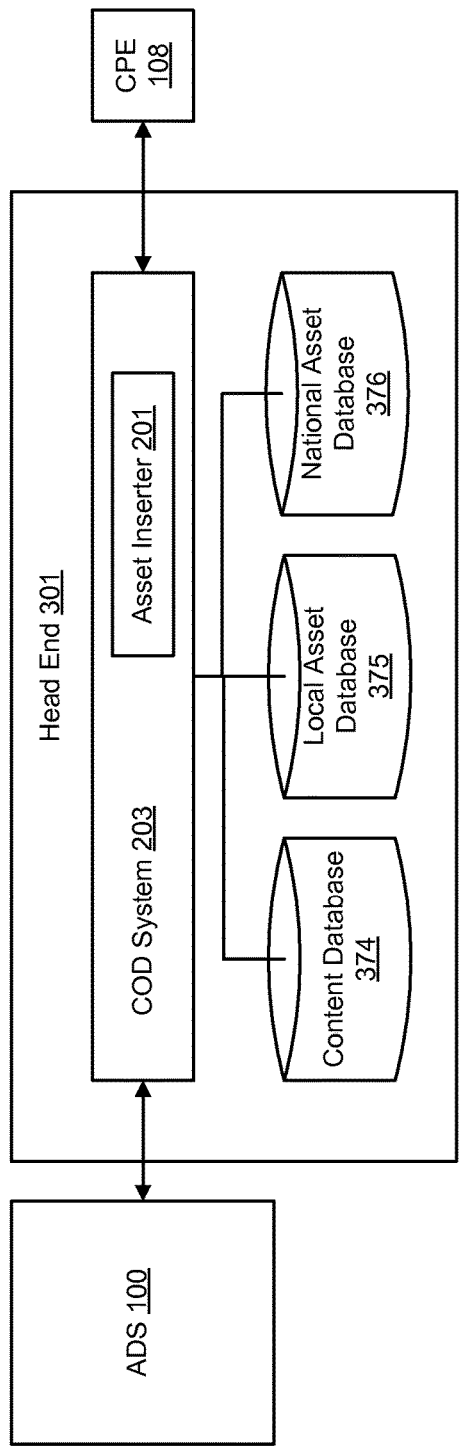
FIG. 2 is a block diagram of a headend operable with an exemplary ADS.

FIG. 2 is a block diagram of an exemplary ADS 100 operable with a COD system 203 (also known as a "COD back office system") of a headend 301 (i.e., a COD provider). The ADS 100 illustrates one example of how the ADS 111 may operate. The headend 301, in this embodiment, is generally any system operable to receive content for processing and distribution to a CPE 108 (e.g., over a cable television infrastructure or from satellite). For example, the headend 301 may receive content from content providers over television signals for distribution to the customers of a cable content provider via the CPE 108.

The COD system 203 of the headend 301 provides the COD content to the CPE 108 when desired by the customer. For example, the headend 301 may receive the content from the content providers and maintain that content within a content database 374. The headend 301 may also maintain local assets in a local asset database 375 and national assets in a national asset database 376. When a particular COD content is selected by the user of the CPE 108, an asset inserter 201 of the COD system 203 accesses the content database 374 to retrieve the selected content and deliver that content to the CPE 108.

The COD system 203 is any system or device that is operable to deliver video content to the CPE 108 when directed by the CPE 108. The databases 374, 375, and 376 are any systems or devices operable to store and maintain data, audio, and/or video for subsequent distribution to the CPE 108. For example, the databases 374, 375, and 376 may be operable within a computer system that stores the video and audio (e.g., MPEG) content and assets such that they may be accessed by the COD system 203 and delivered to the CPE 108 when desired by the user of such.

Figure 3:
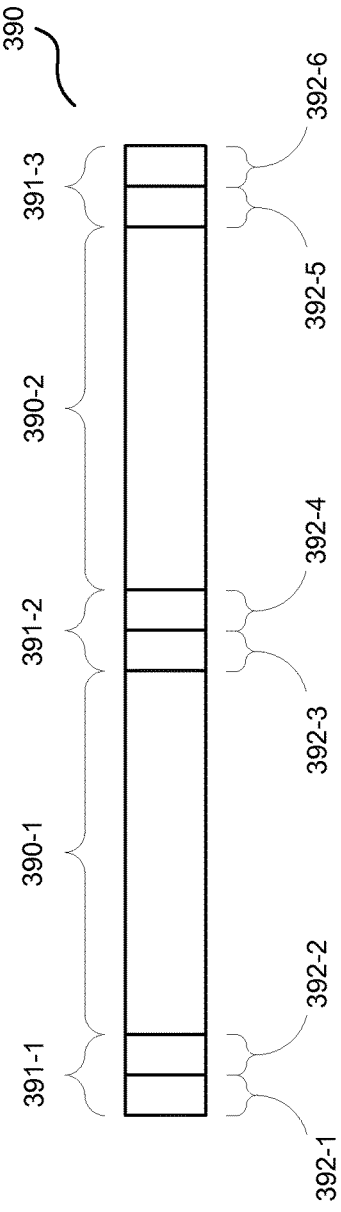
FIG. 3 is an exemplary timing diagram of a COD content selection with timeslots available for asset insertion.

To illustrate the insertion of assets into content, FIG. 3 shows an exemplary timing diagram of content 390 interlaced with asset timeslots 391, also known as "break positions". When the COD system 203 receives a message from the CPE 108 for the content 390, the COD system 203 retrieves the content 390 from the content database 374. The content 390, in this embodiment, is divided into two segments 390-1 and 390-2 with timeslots 391 disposed at the front end of the content 390-1 (i.e., timeslot 391-1 at the pre roll position), in between the content segments 390-1 and 390-2 (i.e., timeslot 391-2 at the mid roll position), and at the end of the content segment 390-2 (i.e., timeslot 391-3 at the post roll position). Each timeslot 391 is divided into two asset placement timeslots 392 (i.e., asset placement opportunities), each of which is capable of accepting an asset that is typically, but not always, 30 seconds in duration. Thus, a placement opportunity is generally a subset of time of a particular timeslot 391. The ADS 100 directs the COD system 203 to insert the assets according to a particular ranking that provides value for the content provider (e.g., monetary value, enhanced relationships with asset providers, etc.). In this regard, the ADS 100 may direct the COD system 203 to select assets from the national asset database 376 and/or the local asset database 375 for insertion into the asset timeslots 392-1-392-6 based on the ranking provided by the ADS 100.

The invention is not intended be limited to any particular number of content segments 390 or any particular number of asset timeslots. In fact, an asset timeslot 392 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 392 may be configured to accept insertions of two 15 second assets. For example, the content 390 may be configured with the mid roll timeslot 391-2 having two 30 second asset timeslots 392-3 and 392-4. The asset timeslot 392-3 can thus be further divided into two 15 second asset timeslots 392-3-1 and 392-3-2, allowing for the insertion of two 15 second assets into the asset timeslot 392-3. Still, the invention is not intended to be limited to any particular asset duration, asset timeslot 392 duration, or timeslot 391 duration as such may be configured to meet certain business and/or technical needs.

It should be noted that the decisions regarding the direction of asset insertions occur quite rapidly. For example, the ADS 100 may be operable to make asset insertion decisions for a plurality of headends 301. And, each headend 301 may be operable to provide COD content to a plurality of CPEs 108 at any given time, possibly thousands or more. Thus, when a COD content selection is made by a particular CPE 108, the ADS 100 responds in substantially real time to ensure that the COD system 203 has ample time to retrieve and insert the assets while processing the content selected by the CPE 108.

Figure 4:
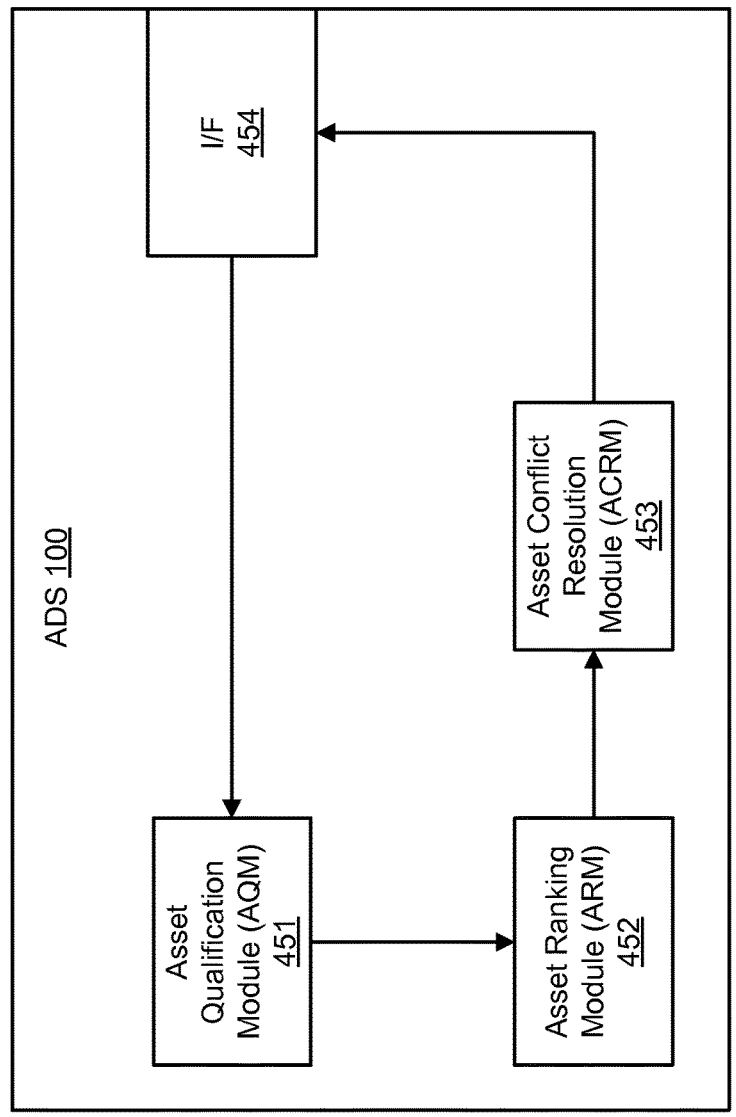
FIG. 4 is a block diagram of an exemplary ADS.

FIG. 4 is a block diagram of an exemplary ADS 100. In this embodiment, the ADS 100 includes an interface 454, an asset qualification module (AQM) 451, an asset ranking module (ARM) 452, and an asset conflict resolution module (ACRM) 453. The interface 454 is any device or system operable to receive information pertaining to a content selection by a CPE 108 such that the ADS 100 may direct asset insertion into the selected content. In this regard, the interface 454 may also be operable to transfer information to the COD system 203 to direct the COD system 203 to insert certain assets from the national asset database 376 and/or the local asset database 375.

The AQM 451 is any device or system operable to communicate with the interface 454 to initially qualify assets for insertion within the content. The AQM 451 may exclude certain assets from insertion into the content selected by the CPE 108. The ARM 452 is any device or system operable to rank the remaining assets (i.e., those not already excluded by the AQM 451) for insertion to the content 390. The ACRM 453 is any device or system operable to remove any ranked assets from insertion into the content 390 based on conflicts between assets. For example, the ACRM 453 may determine that assets from certain advertisers conflict with one another (e.g., Coke and Pepsi). Accordingly, the ACRM 453 may be operable to prevent assets from these advertisers from being inserted within a same timeslot 391 or even within a same content 390. The exemplary operations of the AQM 451, the ARM 452, and the ACRM 453 are explained in greater detail below.

Generally, in this embodiment, the ADS 100 processes information about assets (e.g., advertisements, marketing materials, etc.) of asset providers (e.g., asset owners 101) such that the ADS 100 can direct a content provider to insert assets from the asset providers into COD content selected by a CPE 108. The ADS 100, being communicatively coupled to the COD system 203, processes information pertaining to the content selection and selects assets for insertion into that content from a national asset database and/or a local asset database, as illustrated in FIG. 2. To provide more context to the operations of the ADS 100, the following example is provided.

A CPE 108 selects a particular episode of the television show "30 Rock" at 8 pm on a Thursday night from a menu of COD content that is presented by the COD system 203. The COD system 203 retrieves that episode of 30 Rock from the content database 374. The COD system 203 then retrieves certain assets from the national asset database 376 for insertion into the timeslots of that show. As with many other 30 minute situational comedies, this episode of 30 Rock includes two content sections 390-1 and 390-2 and the three timeslots 391-1, 391-2, and 391-3, as illustrated in FIG. 3. Using this example, the COD system 203 transfers an asset insertion request to the AQM 451 to insert assets into these three timeslots. The AQM 451 then determines that there are a total of six 30 second asset placement opportunities within three timeslots 391-1-3 of the selected content 390. The AQM 451 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
    a) Asset 1 for 100 views anytime;
    b) Asset 2 for any viewing opportunities Monday through Friday between the hours of 5 pm and 10 pm; and
    c) Assets 3 and 4 for any viewing opportunities Friday and Saturday between the hours of 5 pm and 10 pm.
2. A Pepsi-Cola campaign with a total of five assets and four campaign items directing placement opportunities of those assets as follows:
    a) Asset 1 for 20 views anytime;
    b) Asset 2 for 100 views anytime;
    c) Asset 3 for 1000 views anytime;
    d) Asset 4 for any viewing opportunities Monday through Friday between the hours of 5 pm and 10 pm; and
    e) Asset 5 for any viewing opportunities Friday and Saturday between the hours of 5 pm and 10 pm.
3. A Capital One credit card campaign with a total of four assets and three campaign items directing placement opportunities of those assets as follows:
    a) Asset 1 for 100 views anytime;
    b) Asset 2 for 1000 views anytime; and
    c) Assets 3 and 4 for any viewing opportunities Monday through Friday between the hours of 5 pm and 10 pm.
4. A Chrysler Motors campaign with a total of three assets and two campaign items directing placement opportunities of those assets as follows:
    a) Asset 1 for 100 views; and
    b) Assets 2 and 3 for any viewing opportunities Monday through Friday between the hours of 5 pm and 10 pm.
5. A Nickelodeon campaign with one asset and one campaign item directing placement opportunities of that asset as follows:
    a) Asset 1 for 100 views.

Since the television show 30 Rock has a mature theme and since the Nickelodeon campaign is directed towards a younger audience, that campaign item is automatically excluded from the eligible campaign list by the AQM 451. Other remaining campaign items are excluded based on time and date (i.e., campaign items 1c and 2e).

Thus the remaining campaigns of 1a-1b, 2a-2d, 3a-c, 4a-4b are transferred to the ARM 452 for ranking Based on various factors explained in greater detail below, the ARM 452 ranks the campaigns as follows:
1. Campaign Item 2a
2. Campaign Item 1a
3. Campaign Item 3c
4. Campaign Item 2b
5. Campaign Item 4b
6. Campaign Item 4a
7. Campaign Item 1b
8. Campaign Item 1d
9. Campaign Item 2c
10. Campaign Item 1c
11. Campaign Item 2d
12. Campaign Item 3a
13. Campaign Item 3b The ARM 452 transfers this ranked list of campaign items to the ACRM 453 to determine conflicts within the ranked list of campaign items. Typically, the six available asset placement opportunities 392-1-6 within the content 390 would be filled by the first six campaign items based on a rank determined by the ARM 452. However, since some conflicts may exist between campaigns within a particular content and/or timeslot, certain campaigns may be excluded from the placement opportunities 392 such that the ranking is reordered. For example, certain criteria may dictate that a Pepsi Cola asset may not be placed within the same content as a Coca-Cola asset. In this regard, the campaign items 1a-1d are removed from the ranked list because the Pepsi-Cola asset has the higher initial ranking, leaving the following campaign items:
1. Campaign Item 2a
2. Campaign Item 3c
3. Campaign Item 2b
4. Campaign Item 4b
5. Campaign Item 4a
6. Campaign Item 2c
7. Campaign Item 2d
8. Campaign Item 3a
9. Campaign Item 3b With this computed, the ACRM 453 may remove the final three campaign items 7, 8, and 9 from the list as the six placement opportunities can be filled with assets. The ACRM 453 then transfers this information regarding asset placement to the COD system 203.

Once all of the campaign items at each campaign have been evaluated and no campaigns remain or once all of the placement opportunities have been filled, the ACRM 453 directs the COD system 203 to retrieve the assets based on the list generated. For example, the list may be included in a report message that is transferred to the COD system 203 to direct the COD system 203 to insert the assets into the content selected by the CPE 108. It is possible that all of the assets have been excluded during the processes described herein. Thus, the ACRM 453 may then direct the COD system 203 to not place any assets in the content selected by the CPE 457.

The ACRM 453 may even direct the COD system 203 to place assets from the local database 375 and/or the national database 376 into the selected COD content as desired. The ACRM 453 may also direct the COD system 203 to place assets relating to content, programming, or even services provided by the content provider. For example, if no assets remain, standard programming information, such as time and date, pertaining to the selected COD content may be configured as an asset and placed in the selected COD content. To further illustrate, when an episode of "Modern Family" is selected by a CPE 108 and no assets remain for insertion into the available time slots of that episode, the ACRM 453 may direct the COD system 203 to present the user of the CPE 108 with the date and time when the next episode of Modern Family can be seen.

Since it is also possible that not all of the assets in the list may be placed as there may be more assets than available opportunities, the ACRM 453 may weight the assets prior to placement in the selected COD content. For example, certain assets may provide greater value to the content provider (e.g., the television network). In this regard, the ACRM 453 may rank the remaining assets in a manner that provides the most monetary compensation to the content provider. Thus, the ACRM 453 may reduce the list of available assets for insertion to the amount of opportunities, or timeslots, in the selected COD content to provide this value to the content provider. In any case, the ACRM 453 directs the COD system 203 to place the assets in the selected COD content based on the ranked list. Once placement has been directed, the ACRM 453 generates a placement report and transfers that report to the headend 301 so that the headend 301 can track marketing views (e.g., for later negotiations between content providers and marketers). For example, when a marketer can know how many views of a particular asset there were in a selected COD content, the marketer can assign a value to that asset that may be used in negotiating price for additional views of the asset in future selected COD content.

Figure 5:
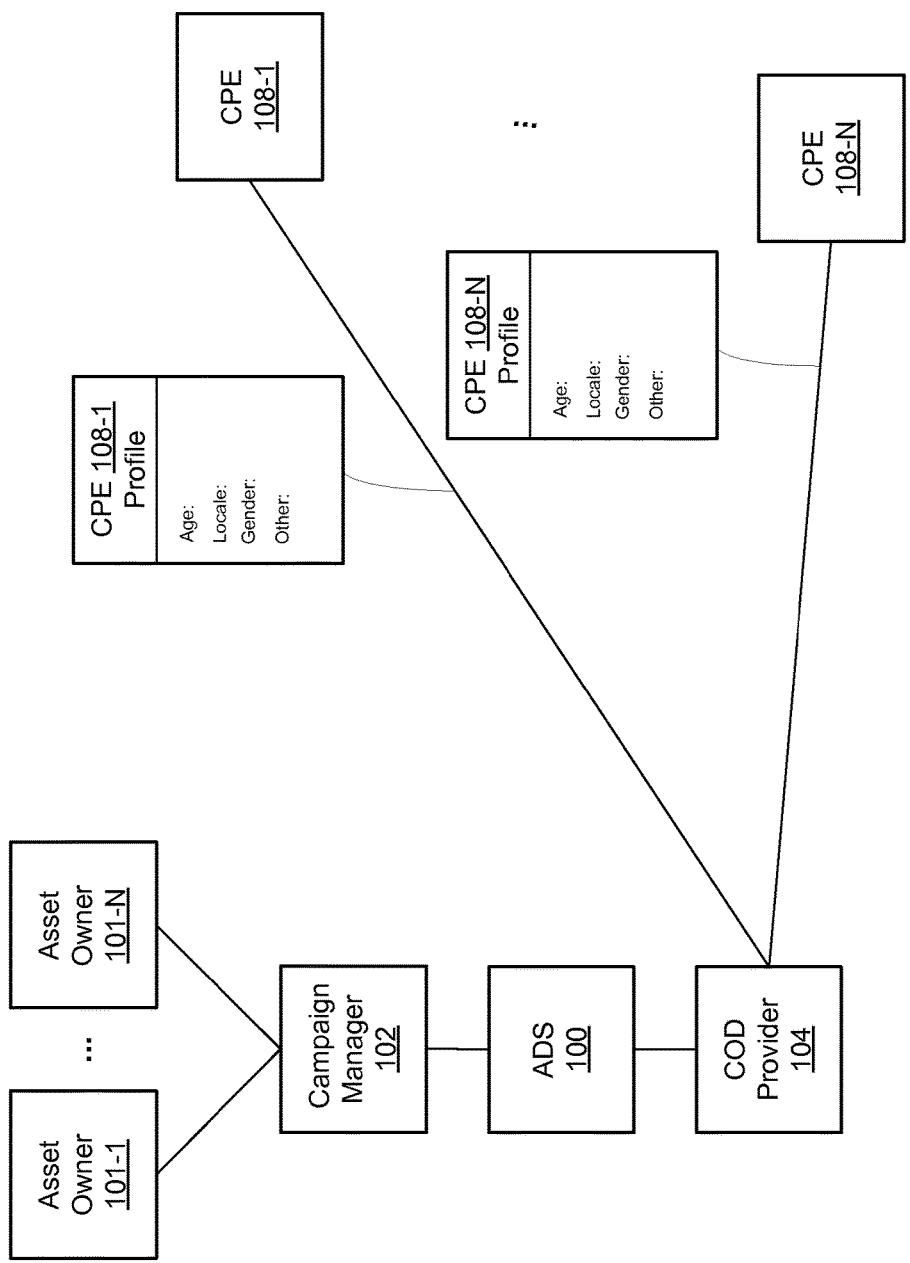
FIG. 5 is a block diagram of the ADS operable with a COD provider to generate user profiles in one exemplary embodiment.

FIG. 5 is a block diagram of the ADS 100 operable with a COD provider 104 to generate user profiles in one exemplary embodiment. However, the ADS 100 may be operable to interface with a plurality of COD providers 104. In this embodiment, the COD provider 104 is communicatively coupled to a plurality of CPEs 108-1-108-N. The COD provider 104 is operable to provide COD content to the CPEs 108 when selected by the CPEs 108. For example, a user of the CPE 108-1 may wish to view an episode of "Modern Family" on ABC whereas the user of the CPE 108-N may wish to view an episode of "Walking Dead" on AMC. The users, through their respective CPEs 108, can select those episodes at their leisure. Then, the COD provider 104 provides those episodes directly to the CPEs 108, as described above.

The episodes of Modern Family and Walking Dead are tailored to a certain demographic. And, advertisers have certain demographics which they wish to target. For example, advertisers wishing to sell shaving cream would probably more likely target advertisements for the show Walking Dead as opposed to a show on the "Lifetime Network". The COD provider 104 tracks the COD content selections by the CPEs 108-1-108-N and generates user profiles for those CPEs based on the COD content selections and the demographics associated with those selections (e.g., age, locale, gender, etc.). Then the COD provider 104 can relay that information to the ADS 100 so that it may select more appropriate assets for future COD content selections by the CPEs 108.

It should be noted that the CPEs 108 do not necessarily have a single CPE profile associated therewith based on the COD content selections by the CPEs. For example, a household may have multiple members of varying demographics. The COD provider 104 is operable to distinguish those demographics of the members of the household and generate user profiles for each member of the household. Details of such are shown and described further below.

Figure 6:
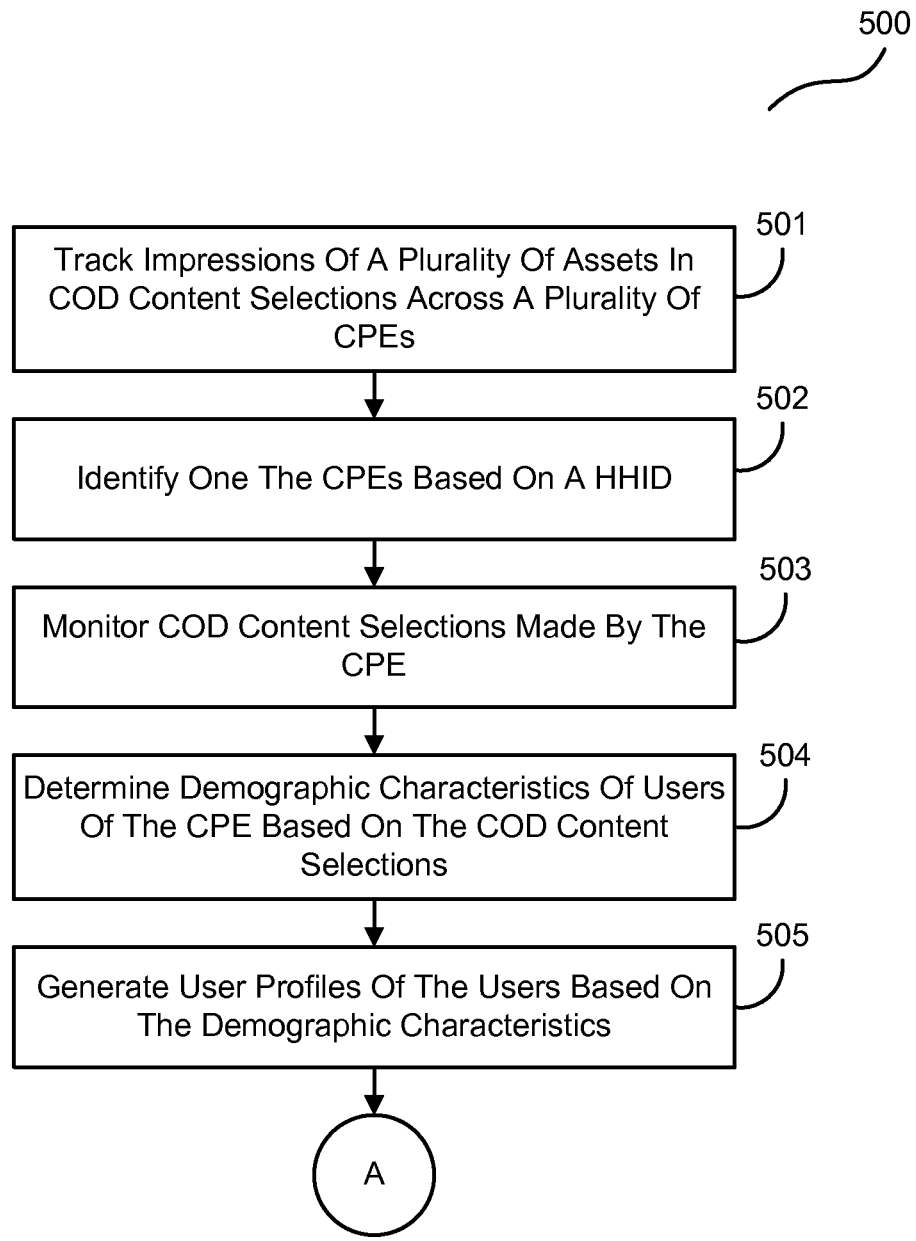
FIGS. 6-7 are flowcharts of exemplary processes operable with the embodiment of FIG. 5.
Figure 7:
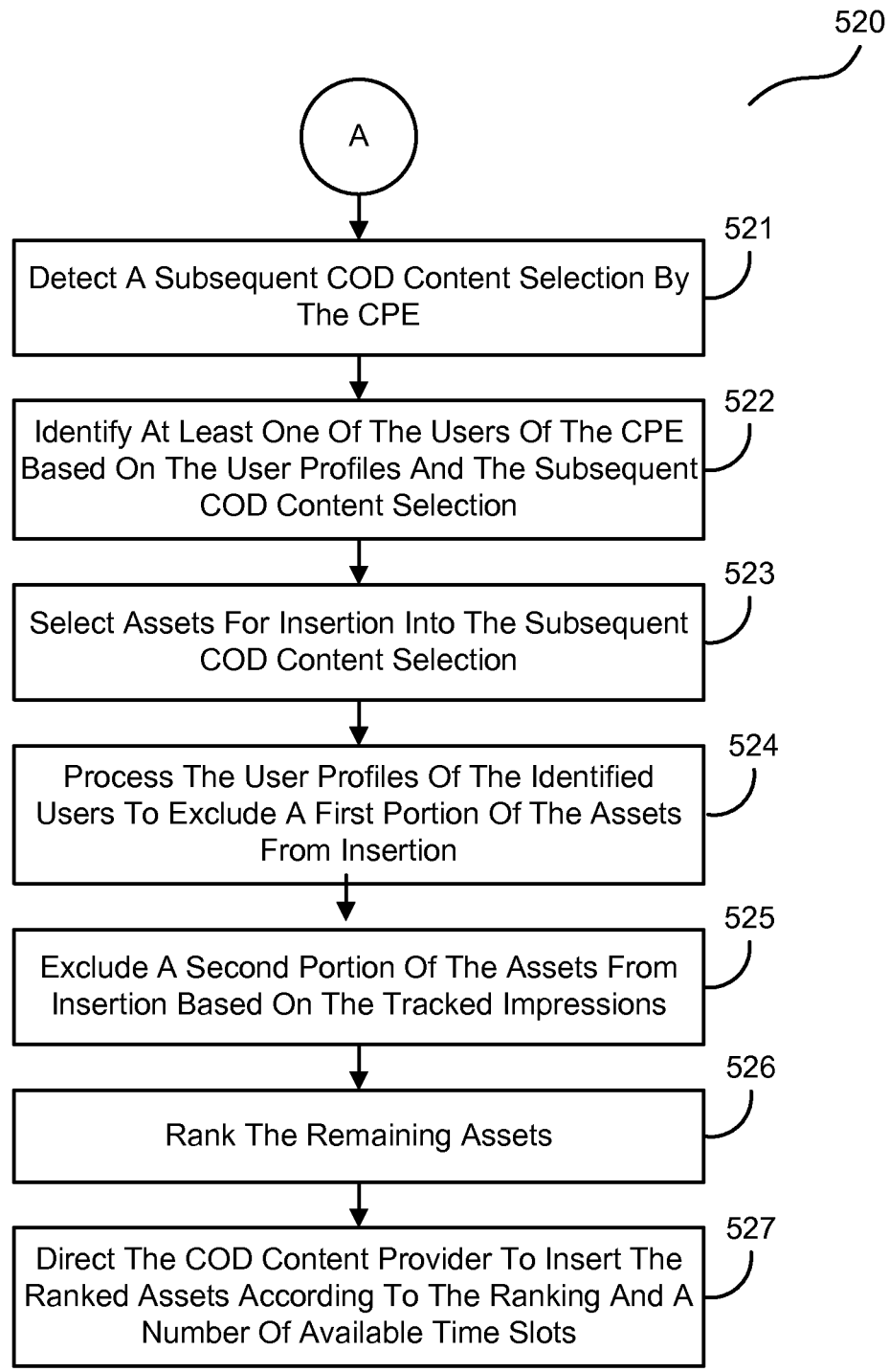

FIGS. 6-7 are flowcharts of exemplary processes 500 and 520 operable with the embodiment of FIG. 5. For the purposes of illustration, the process will be generally discussed with respect to a single CPE 108. In the process element 501 of the process 500 of FIG. 6, the COD provider 104 tracks impressions of a plurality of assets in COD content selections across a plurality of CPEs 108 such that the ADS 100 can make asset insertion decisions on behalf of the COD provider 104. For example, the asset owners 101-1-101-N have asset campaigns that direct insertion of assets into the COD content selections by the CPEs 108. If a particular asset of one asset campaign is approaching its limit for a predetermined number of insertions, the ADS 100 may exclude that asset from subsequent COD content selections, as discussed above.

The COD provider 104, being communicatively coupled to each of the CPEs 108, is operable to identify a first of the CPEs 108 (e.g., CPE 108-1) based on its Household identification (HHID), in the process element 502. Then, the COD provider 104 can monitor the COD content selections made by that CPE 108-1, in the process element 503. After some period of time, the COD provider 104 may determine demographic characteristics of users of the CPE 108-1, in the process element 504. For example, suppose the CPE 108-1 is located in the family room of the household comprising a husband, a wife, a teenage son, and an elementary school-age daughter. Over time, and based on the COD content selections from the COD provider 104, the COD provider 104 may be operable to deduce certain demographics of the users and associate those demographics with that CPE 108-1. Accordingly, the COD provider 104 generates the user profiles of the users based on the demographic characteristics, in the process element 505.

The process 500 links to the process 520 in FIG. 7 and assumes that the user profiles for the CPE 108-1 have been generated. Then, the COD provider 104 detects a subsequent COD content selection by the CPE 108-1, in the process element 521. Based on that subsequent COD content selection, the COD provider 104 identifies at least one of the users of the CPE 108-1 via the user profiles, in the process element 522.

Once the user of the CPE 108-1 has been identified, that information is relayed by the COD provider 104 to the ADS 100 such that the ADS 100 can select assets for insertion into the subsequent COD content selection, in the process element 523. For example, the ADS 100 would typically select assets and perform a ranking of those assets for insertion into the COD content selection by the CPE 108-1, as discussed above. Once those assets are ranked, the ADS 100 would typically direct insertion of the ranked assets into the COD content selection. In this embodiment, however, the ADS processes the user profiles of the identified users to first exclude a first portion of the assets from insertion, in the process element 524, before any ranking is performed. To illustrate, the COD provider 104 may determine that the user of the CPE 108-1 is the teenage boy. The ADS 100 will therefore exclude assets that may not be appropriate for that user (e.g., beer commercials, tampon commercials, etc.).

With these assets excluded from insertion into the COD content selection by the CPE 108-1, the ADS 100 begins to exclude a second portion of the assets from insertion based on the tracked impressions, in the process element 525. For example, identifying a user and delivering assets to that user in a COD content selection can provide the user with more relevant viewing material. However, that does not necessarily provide the optimal solution as asset owners 101 are also integral part of the process. Accordingly, in the process element 525, the ADS 100 operates in accordance with the embodiments described hereinabove to exclude a second portion of the assets based on the tracked impressions obtained in the process element 501. Then, the ADS 100 ranks the remaining assets, in the process element 526, and directs a COD content provider 104 to insert the ranked assets according to the ranking and the number of available timeslots in the COD content selection made by the CPE 108-1, in the process element 528.

Figure 8:
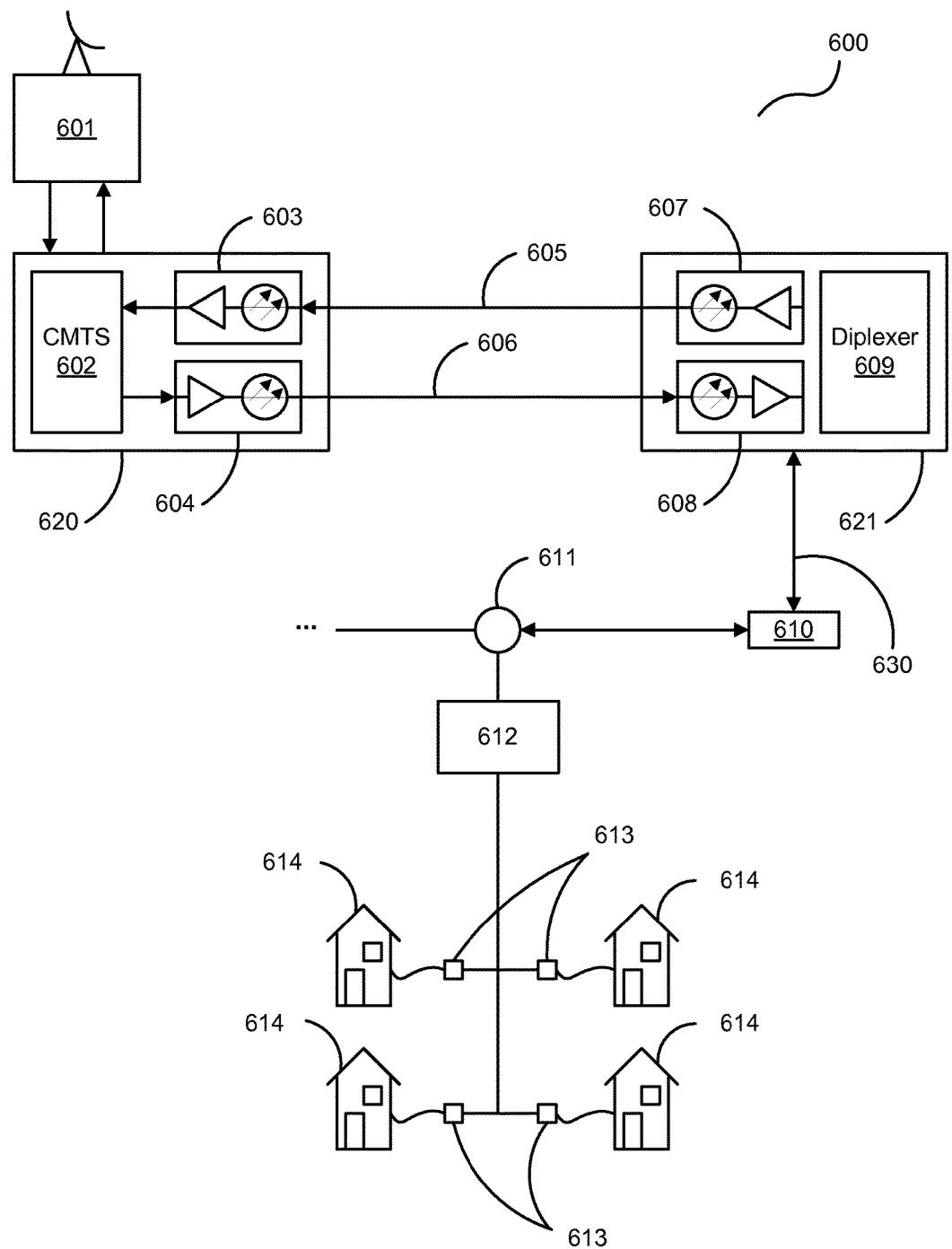
FIG. 8 is a block diagram of an exemplary cable television network in which the COD provider may be incorporated.

FIG. 8 is a block diagram of one exemplary cable television system 600 operable with the ADS 100 of FIG. 1. For example, the concepts disclosed herein may be implemented in a cable television communication system that employs RF signaling techniques across a substantial amount of RF spectrum. And, the COD content provider is a cable television headend 601. An upstream link of the cable television communication system 600, in this embodiment, provides high speed data services being delivered over devices conforming to the Data Over Cable Service Interface Specification (DOCSIS) specification. The communication system 600 includes a headend 601 configured with an upstream hub 620. The hub 620 is coupled to a downstream node 621 via optical communication links 605 and 606.

The hub 620 includes a Cable Modem Termination System (CMTS) 602, an electrical to optical converter 603, and an optical to electrical converter 604. The node 621 is similarly configured with an optical to electrical converter 608 and an electrical to optical converter 607. The headend 601 is generally the source for various television signals. Antennas may receive television signals that are converted as necessary and transmitted over fiber optic cables 605 to the hub 620. Several hubs may be connected to a single headend 601 and the hub 620 may be connected to several nodes 621 by fiber optic cable links 605 and 606. The CMTS 602 may be configured in the headend 601 or in the hub 620. The fiber optic links 605 and 606 are typically driven by laser diodes, such as Fabry Perot and distributed feedback laser diodes.

Downstream, in homes/businesses are devices (e.g., UEs 105 (called the Cable Modems (CM; not shown). A CM acts as a host for an Internet Protocol (IP) device such as personal computer. Transmissions from the CMTS 602 to the CM are carried over the downstream portion of the cable television communication system generally from 54 to 860 MHz. Downstream digital transmissions are continuous and are typically monitored by many CMs. Upstream transmissions from the CMs to the CMTS 602 are typically carried in the 5-42 MHz frequency band, the upstream bandwidth being shared by the CMs that are on-line. However, with greater demands for data, additional frequency bands and bandwidths are continuously being considered and tested, including those frequency bands used in the downstream paths.

The CMTS 602 connects the local CM network to an Internet backbone. The CMTS 602 connects to the downstream path through the electrical to optical converter 604 that is connected to the fiber optic cable 606, which in turn, is connected to the optical to electrical converter 608 at the node 621. The signal is transmitted to a diplexer 609 that combines the upstream and downstream signals onto a single cable. The diplexer 609 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other larger bands are being considered to provide increased capacity. However, the invention is not intended to be limited to any particular form of communication system.

After the downstream signal leaves the node 621, the signal is typically carried by a coaxial cable 630. At various stages, a power inserter 610 may be used to power the coaxial line equipment, such as amplifiers or other equipment. The signal may be split with a splitter 611 to branch the signal. Further, at various locations, bi-directional amplifiers 612 may boost and even split the signal. Taps 613 along branches provide connections to subscriber's homes 614 and businesses.

Upstream transmissions from subscribers to the hub 620/headend 601 occur by passing through the same coaxial cable 630 as the downstream signals, in the opposite direction on a different frequency band. The upstream signals are sent typically utilizing Quadrature Amplitude Modulation (QAM) with forward error correction. The upstream signals can employ any level of QAM, including 8 QAM, 32 QAM, 64 QAM, and even 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Transmissions, in this embodiment, are typically sent in a frequency/time division multiplexing access (FDMA/TDMA) scheme, as specified in the DOCSIS standards. The diplexer 609 splits the lower frequency signals from the higher frequency signals so that the lower frequency, upstream signals can be applied to the electrical to optical converter 607 in the upstream path. The electrical to optical converter 607 converts the upstream electrical signals to light waves which are sent through fiber optic cable 605 and received by optical to electrical converter 603 in the node 620.

Figure 9:
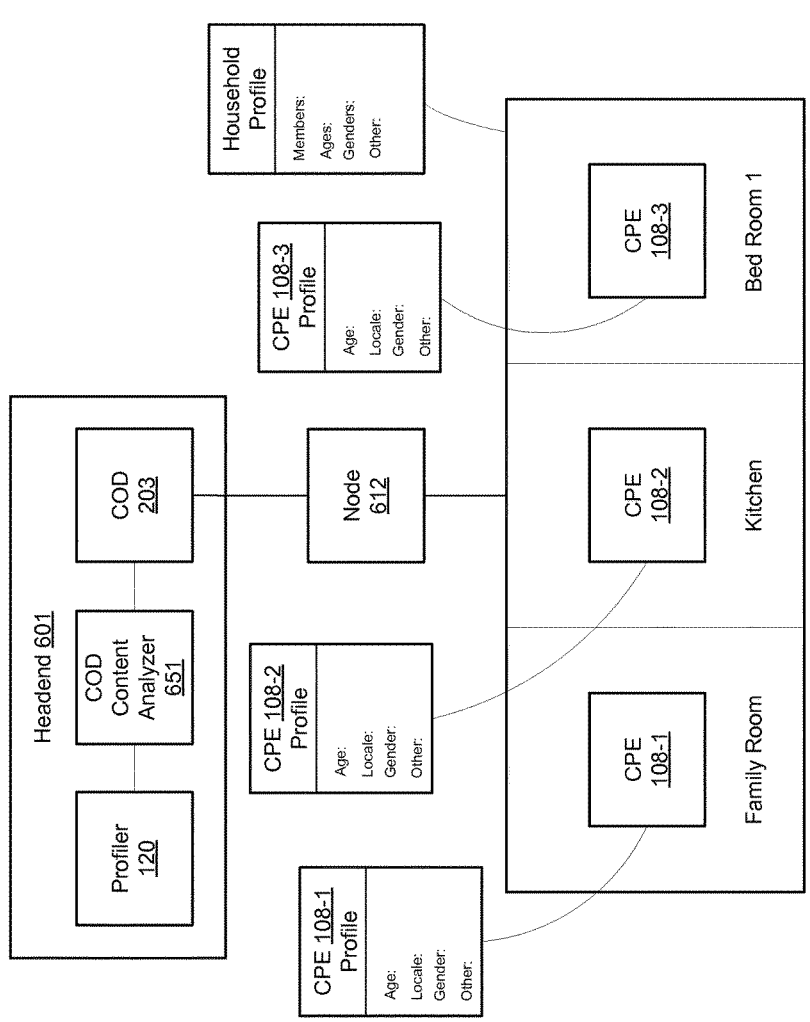
FIG. 9 is a block diagram of an exemplary profiler operable to generate the user profiles.

FIG. 9 is a block diagram of an exemplary profiler 120 operable to generate the user profiles at the headend 601. The headend 601 is communicatively coupled (e.g., through the node 612) to a household that comprises three CPEs 108-1-108-3. The COD content analyzer 651 of the headend 601 monitors each of the COD content selections made by the CPE 108 in the household and extracts the demographic information associated with the COD content selections such that the profiler 120 can generate a household profile for all of the users in the household. Thus, when a COD content selection is made that corresponds to multiple users in that household, the ADS 100 can identify assets that would be relevant to all of the users in that household (e.g., Disney vacation commercials, Coca-Cola commercials, etc.).

The profiler 120 is also operable to generate user profiles for each individual in the household. Using the example above, the household may comprise a husband, a wife, a teenage son, and an elementary school daughter. The wife, cooking in the kitchen, may be viewing COD content selections on the CPE 108-2. Based on the CPE 108-2 itself and the COD content selections made by that CPE 108-2, the profiler 120 may determine that the wife is indeed the user of that CPE 108-2 and transfer the user profile associated with that CPE 108-2 to the ADS 100 such that the ADS 100 may make asset insertion decisions on behalf of the COD system 203 for that CPE 108-2. In other words, the ADS 100 may select assets that are perhaps more relevant to the wife than the children or the husband.

Similarly, the COD content analyzer 651 may be monitoring a COD content selection by the CPE 108-1 in the family room and determine that the teenage son and the elementary school daughter are viewing that selection. In this regard, the profiler 120 may determine such and transfer the profile of those users to the ADS 100 such that it may select assets more relevant to those users. Moreover, the CPEs 108-1 and 108-2 can even be viewing the same COD content selection at the same time with the profiler 120 determining that two different sets of users exist such that the ADS 100 can select assets for those two different sets users based on the profiles from the profiler 120. For example, if the profiler 120 determines that the wife is indeed cooking in the kitchen watching a COD content selection (e.g., an episode of Modern Family) via the CPE 108-2 while the children are watching the same COD content selection on the CPE 108-1, the ADS 100 may select assets more relevant to the wife for the CPE 108-2 while selecting other assets more relevant to the children for the CPE 108-1. Afterwards, the ADS 100 performs its ranking and exclusion process as described above.

Figure 10:
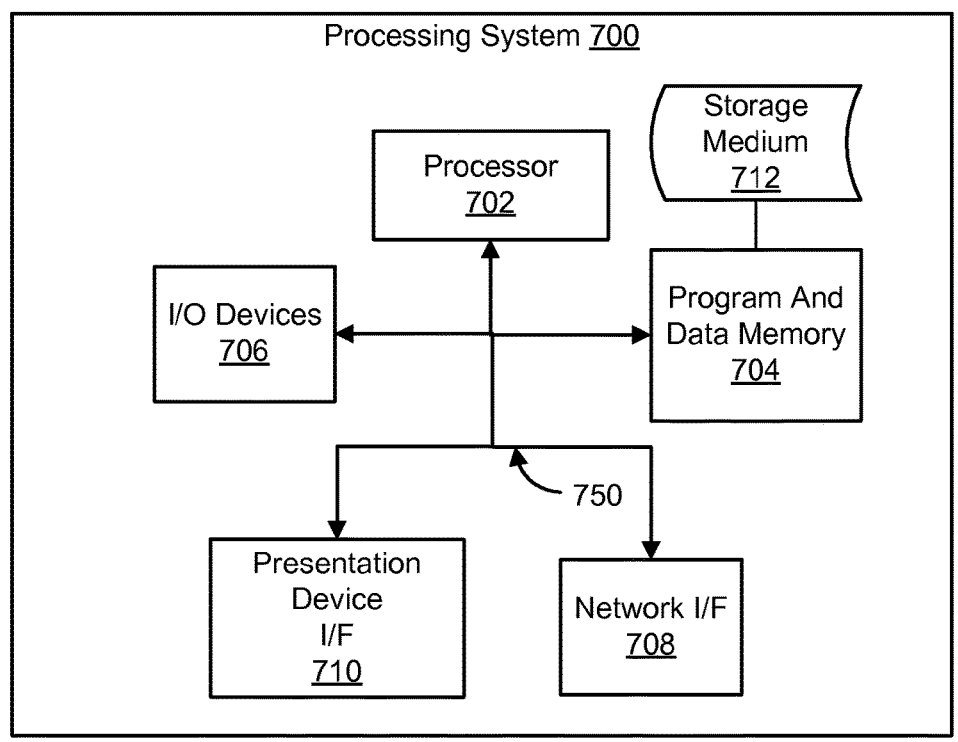
FIG. 10 is a block diagram of an exemplary processing system operable to implement at least portions of the embodiment herein.

FIG. 10 is a block diagram depicting a processing system 700 operable to provide the above features by executing programmed instructions and accessing data stored on a computer readable storage medium 712. In this regard, embodiments of the invention can take the form of a computer program accessible via the computer-readable medium 712 providing program code for use by a computer or any other instruction execution system. For the purposes of this description, computer readable storage medium 712 can be anything that can contain, store, communicate, or transport the program for use by a computer.

The computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 700, being suitable for storing and/or executing the program code, includes at least one processor 702 coupled to memory elements 704 through a system bus 750. Memory elements 704 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 706 (including but not limited to keyboards, displays, pointing devices, etc.) can be coupled to the processing system 700 either directly or through intervening I/O controllers. Network adapter interfaces 708 may also be coupled to the system to enable the processing system 700 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be coupled to the system to interface to one or more presentation devices, such as printing systems and displays for presentation of presentation data generated by the processor 702.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only a preferred embodiment and variants thereof have been shown and described and that all changes and modifications that come within the spirit of the invention are desired to be protected.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass satellite content providers that offer COD content and/or Internet services to its subscribers. That content is typically delivered directly to the subscriber's antenna for demodulation and decryption by the subscriber's CPE 108. Internet traffic in such a system may be conveyed by satellite and/or other delivery mechanisms (e.g., digital subscriber lines, or "DSL", delivered through subscriber phone lines).

A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein, is any type of media, such as audio and/or video, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) and pay-per-view (PPV) delivered by both modern cable television and satellite television.

What is claimed is:

1. A system operable in a Content-On-Demand (COD) environment, the system comprising:
    an audience profiler operable to identify a first customer premise equipment (CPE) based on a Household identification (HHID), to monitor COD content selections made by the first CPE, to determine demographic characteristics of one or more users of the first CPE based on the COD content selections, to generate user profiles of the one or more users based on the demographic characteristics, and to identify a first of the one or more users of the first CPE based on the user profiles and a subsequent COD content selection from the first CPE; and
    an asset decision system (ADS) communicatively coupled to the audience profiler and operable to track impressions of a plurality of assets in COD content selections across a plurality of CPEs, to detect the subsequent COD content selection by the first CPE, to select a set of assets from the plurality of assets for insertion into the subsequent COD content selection, to process the user profile of the first user to exclude a first portion of the selected set of assets from insertion into the subsequent COD content selection, to exclude a second portion of the selected set of assets from insertion into the subsequent COD content selection based on the tracked impressions of the plurality of assets, to rank assets remaining in the selected set of assets, and to direct a COD content provider providing the subsequent COD content selection to insert the ranked assets according to the ranking and a number of available time slots in the subsequent COD content selection,
    wherein the COD provider is a cable television provider, the audience profiler is configured with the cable television provider, and
    the ADS is remotely located from the COD provider and is operable to interface with another COD provider.

2. The system of claim 1, wherein:
    the user profile of the first user comprises age, gender, and location information.

3. A method operable in a Content-On-Demand (COD) environment, the method comprising:
    via an asset decision system (ADS): tracking impressions of a plurality of assets in COD content selections across a plurality of customer premise equipment (CPEs);
    via an audience profiler: identifying a first of the CPEs based on a Household identification (HHID);
    monitoring COD content selections made by the first CPE;
    determining demographic characteristics of one or more users of the first CPE based on the COD content selections made by the first CPE; and generating user profiles of the one or more users based on the demographic characteristics;

via the ADS: detecting a subsequent COD content selection by the first CPE;

via the audience profiler: identifying a first of the one or more users of the first CPE based on the user profiles and the subsequent COD content selection from the first CPE; and via the ADS: selecting a set of assets from the plurality of assets for insertion into the subsequent COD content selection;

processing the user profile of the first user to exclude a first portion of the selected set of assets from insertion into the subsequent COD content selection;

excluding a second portion of the selected set of assets from insertion into the subsequent COD content selection based on the tracked impressions of the plurality of assets;

ranking assets remaining in the selected set of assets; and directing a COD content provider providing the subsequent COD content selection to insert the ranked assets according to the ranking and a number of available time slots in the subsequent COD content selection, wherein the COD provider is a cable television provider, the audience profiler is configured with the cable television provider, and the ADS is remotely located from the COD provider and is operable to interface with another COD provider.

4. The method of claim 3, wherein:

the user profile of the first user comprises age, gender, and location information, user comprises age, gender, and location information.

5. A non-transitory computer readable medium comprising instructions that, when executed by one or more processors in a Content-On-Demand (COD) environment, direct the processors to:

via an asset decision system (ADS): track impressions of a plurality of assets in COD content selections across a plurality of customer premise equipment (CPEs);

via an audience profiler: identify a first of the CPEs based on a Household identification (HHID);

monitor COD content selections made by the first CPE;

determine demographic characteristics of one or more users of the first CPE based on the COD content selections made by the first CPE; and generate user profiles of the one or more users based on the demographic characteristics;

via the ADS: detect a subsequent COD content selection by the first CPE;

via the audience profiler: identify a first of the one or more users of the first CPE based on the user profiles and the subsequent COD content selection from the first CPE; and via the ADS: select a set of assets from the plurality of assets for insertion into the subsequent COD content selection;

process the user profile of the first user to exclude a first portion of the selected set of assets from insertion into the subsequent COD content selection;

exclude a second portion of the selected set of assets from insertion into the subsequent COD content selection based on the tracked impressions of the plurality of assets;

rank assets remaining in the selected set of assets; and direct a COD content provider providing the subsequent COD content selection to insert the ranked assets according to the ranking and a number of available time slots in the subsequent COD content selection, wherein the COD provider is a cable television provider, the audience profiler is configured with the cable television provider, and the ADS is remotely located from the COD provider and is operable to interface with another COD provider.

6. The computer readable medium of claim 5, wherein:

the user profile of the first user comprises age, gender, and location information, user comprises age, gender, and location information.

\* \* \* \* \*